US006823754B2

(12) United States Patent
Boll et al.

(10) Patent No.: US 6,823,754 B2
(45) Date of Patent: Nov. 30, 2004

(54) METHOD OF CALIBRATING A CLUTCH ACTUATOR WITH A COMPENSATING SPRING

(75) Inventors: Bernhard Boll, Alling (DE); Sarah Ann Barker, Leamington Spa (GB)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/683,485

(22) Filed: Oct. 9, 2003

(65) Prior Publication Data

US 2004/0128051 A1 Jul. 1, 2004

Related U.S. Application Data

(63) Continuation of application No. PCT/DE02/01300, filed on Apr. 9, 2002.

(30) Foreign Application Priority Data

Apr. 12, 2001 (GB) .............................................. 0109222

(51) Int. Cl.[7] ...................... G01M 13/02; G01M 19/00; F16D 48/06; G05D 3/00; G05G 23/00
(52) U.S. Cl. ........................ 73/865.9; 73/1.79; 700/302; 310/75 R; 310/98; 192/84.6
(58) Field of Search ................................ 73/865.9, 1.79; 702/94; 700/302; 701/67–68, 29; 192/84.6; 310/75 R, 75 A, 80, 97–98

(56) References Cited

U.S. PATENT DOCUMENTS

| | | | | | |
|---|---|---|---|---|---|
| 1,808,930 | A | * | 6/1931 | Messiter | ........................ 177/16 |
| 3,012,502 | A | * | 12/1961 | Moon et al. | ................. 102/412 |
| 4,543,732 | A | * | 10/1985 | Maples | ........................ 73/1.79 |
| 5,161,405 | A | * | 11/1992 | Macqueene | ................... 700/302 |
| 5,532,583 | A | * | 7/1996 | Davis et al. | .................. 324/202 |
| 5,678,673 | A | | 10/1997 | Borschert et al. | ........... 192/84.6 |
| 5,954,178 | A | | 9/1999 | Fischer et al. | ................. 192/90 |
| 5,984,072 | A | | 11/1999 | Leimbach et al. | ........ 192/111 A |
| 6,494,810 | B1 | * | 12/2002 | Mack et al. | ................... 477/174 |
| 6,577,975 | B2 | * | 6/2003 | Chiesa | ......................... 702/94 |
| 6,634,206 | B2 | * | 10/2003 | Cui et al. | ..................... 73/1.79 |
| 6,647,333 | B2 | * | 11/2003 | Jager et al. | .................... 701/67 |
| 6,675,115 | B2 | * | 1/2004 | Batchelor et al. | .............. 702/94 |
| 6,752,031 | B2 | * | 6/2004 | Akamatsu et al. | .......... 73/865.9 |
| 2002/0128763 | A1 | | 9/2002 | Jager et al. | .................... 701/67 |

FOREIGN PATENT DOCUMENTS

| | | | | |
|---|---|---|---|---|
| GB | 2 309 761 A1 | 8/1997 | ........... | F16D/28/00 |
| GB | 2 313 885 A1 | 12/1997 | ........... | F16H/63/30 |
| GB | 2 325 036 A1 | 11/1998 | ........... | F16D/48/06 |
| JP | 05164541 A | * 6/1993 | ............ | G01B/7/00 |

* cited by examiner

Primary Examiner—Thomas P Noland
(74) Attorney, Agent, or Firm—Darby & Darby

(57) ABSTRACT

A method of calibrating an equilibrium position of an actuator driven by an electric motor with the assistance of a compensating spring, wherein the actuator moves a mechanism and the mechanism opposes the movement with an elastic force, and wherein in the equilibrium position the compensating spring counterbalances the elastic force, includes the following steps:

applying a large-amplitude, high-frequency alternating position signal to energize the electric motor, wherein the position signal is biased so that alternating extremes of the position signal straddle the equilibrium position, measuring an actual dynamically variable position of the actuator by means of a position sensor, and determining the equilibrium position as that position where the actuator settles.

6 Claims, 4 Drawing Sheets

METHOD OF CALIBRATING A CLUTCH ACTUATOR WITH A COMPENSATING SPRING

CROSS-REFERENCE TO RELATED APPLICATION

This application is a continuation of International Patent Application Ser. No. PCT/DE02/01300, filed Apr. 9, 2002, published in German, which is hereby incorporated by reference in its entirety.

BACKGROUND OF THE INVENTION

The invention relates to a method of calibrating an equilibrium position of an electrically operated actuator in a motor vehicle clutch or in a gear-selecting mechanism, where the electric motor driving the actuator is assisted by a compensating spring.

Electrically operated actuators of the kind that the present invention relates to are disclosed for example in GB 2325036, GB 2313885, or GB 2309761. The disclosures of these documents are expressly incorporated herein by reference. Such actuators include an electric motor, which drives a hydraulic master cylinder that communicates with a slave cylinder which, in turn, actuates a vehicle clutch or a gear-ratio selecting mechanism. The electric motor in these actuators can work through an appropriate gear mechanism such as a worm-drive mechanism to drive a push rod. One end of the push rod is connected to a crank that is tied to the gear wheel of the worm-drive mechanism, while the other end of the push rod is connected to a piston that slides in a master cylinder, so that the rotary movement of the gear wheel is converted into a linear movement of the piston. The electric motor, the gear mechanism, and the master cylinder are preferably arranged together in a common housing.

The master cylinder of the electric actuator described above is typically connected to a slave cylinder of a clutch. When pressure is applied to the slave cylinder, a clutch release fork is actuated which acts on a clutch release bearing to generate a force that disengages the clutch. The release bearing typically acts on a diaphragm spring which in its normal (i.e., non-actuated) state holds the discs of the clutch in frictional engagement. When the diaphragm spring is depressed by the release bearing, the clutch discs move apart, so that the clutch becomes disengaged. The force generated by the electric motor therefore has to be large enough to depress the diaphragm spring to an extent that is sufficient to release the engagement of the clutch. The force required to disengage the clutch is typically of the order of 450 N.

In order to reduce the size of the electric motor required for such actuators, it has been proposed to include a compensating spring in the electric actuator, so that the compensating spring counteracts the opposing force of the diaphragm spring. This may be accomplished for example with an arrangement where the compensating spring is fully compressed in the completely engaged state of the clutch, whereby-the compensating spring generates a force of, e.g., 250 N in the electric actuator in the direction of disengagement of the clutch. In the process of disengaging the clutch, the initial amount of force to depress the diaphragm spring will now be supplied by the compensating spring. Although the force of the compensating spring decreases over the phase where the compensating spring and the diaphragm spring counteract each other, the electric motor only needs to generate a force of the order of 200 N to fully disengage the clutch. Thus, the requirement for the electric motor to produce 450 to 500 N, the amount of force that would be required without the compensating spring, can be reduced to 250 to 300 N through the use of a compensating spring.

In electric actuators of the type disclosed in the aforementioned references, a high level of static friction between the worm and the gear wheel provides a self-holding effect. However, in the interest of optimizing the efficiency of the actuator, it may be desirable if the internal static friction of the actuator is smaller than would be required to keep the actuator immobilized. In this case, it is possible that the force exerted by the diaphragm spring in the disengaged state of the clutch will force the actuator back, or that the force exerted by the compensating spring in the engaged state of the clutch will push the actuator forward, i.e., in the direction of disengagement. If this causes the actual position of the actuator to deviate from the required position by more than a predetermined tolerance, the controller will reactivate the actuator motor.

The German Patent Application DE 10062456.1, which is hereby incorporated by reference in the present disclosure, proposes the following concept to counteract the force of the diaphragm spring which could cause an unintended re-engagement of the clutch: When the actuator is in its rest position, a voltage of typically 7 percent of the maximum PWM voltage (Pulse Width Modulation voltage) is applied to the electric motor in the direction where the motor will support the compensating spring to counteract the force of the diaphragm spring. This voltage generates a force in the actuator which prevents the actuator from moving backward because of the reactive force of the diaphragm spring. However, in order to prevent a forward movement of the actuator in the engaged state of the clutch, the 7 percent voltage is applied only when the force generated by the compensating spring is smaller than the force produced by the diaphragm spring.

Consequently, this system requires that the equilibrium position is known where the forces of the compensating spring and the diaphragm spring keep each other in balance. In clutches with self-adjusters that adjust the position of the pressure plate to compensate for the wear on the friction surfaces, the equilibrium position remains substantially unchanged over the life of the clutch. In clutches of this type, the equilibrium position may be precalibrated. However, in a clutch without the self-adjusting feature, the equilibrium position changes significantly as the components of the clutch wear down in use. In clutches of this latter type, the concept of energizing the electric motor with 7 percent of the maximum PWM voltage cannot be used, and a much more complex adaptive strategy with a continuous current supply has to be used.

OBJECT OF THE INVENTION

The present invention therefore has the objective to provide a method of calibrating the equilibrium position where the forces of the diaphragm spring and the compensating spring counterbalance each other, so that an initial calibration can be performed at the end of the assembly line after the system has been installed in the vehicle, and recalibrations can be performed at regular time intervals, for example with the routine maintenance services, so that the concept of using the assistance of the electric motor at 7 percent of the maximum PWM voltage can be used in clutches without self-adjusters.

SUMMARY OF THE INVENTION

A method according to the present invention serves to calibrate the equilibrium position of a clutch actuator that is driven by an electric motor and assisted by a compensating spring, where the latter is used to compensate an opposing elastic force of the mechanism that is operated by the actuator. The method includes the steps of:

applying a large-amplitude, high-frequency alternating position signal to energize the electric motor, where the position signal alternates between extremes that correspond to actuator positions spanning across the equilibrium position, measuring the actual position of the actuator by means of a position sensor associated with the actuator, and determining the equilibrium position as the position into which the actuator settles as long as the alternating position is applied.

Due to the combined force/displacement characteristic of the compensating spring and the counteracting elastic force of the mechanism, the actuator with the assistance of the compensating spring moves rapidly into the equilibrium position, while the speed of the actuator movement is significantly reduced when the motor is working against the opposing elastic force of the mechanism. Likewise, when the motor is energized in the reverse direction, the actuator returns rapidly to the equilibrium position and then continues slowly beyond the equilibrium position as the compensating spring is being compressed. As a result, the range of the movement of the actuator is centered on the equilibrium position. The higher the frequency of the alternating signal, the shorter the distance by which the actuator moves in either direction beyond the equilibrium position. Consequently, the equilibrium position can be determined more precisely by using a higher frequency. According to a preferred embodiment, the frequency of the alternating position signal is 25 Hz or higher. Particularly preferred is a position signal with a frequency of about 50 Hz.

The closer the midpoint of the alternating position signal is to the equilibrium position, the more accurate will be the result of the equilibrium determination. Consequently, it is possible to use an iterative technique of successive determinations of the equilibrium position where in each iteration the midpoint of the alternating position signal is positioned on the equilibrium position determined in the previous step until the equilibrium position coincides with the midpoint of the alternating position signal. Initially, the midpoint of the alternating position signal may be set so that it coincides with a theoretical equilibrium position calculated from the design characteristics of the actuator and mechanism or with the last known equilibrium position at which the system of actuator and mechanism was recalibrated.

BRIEF DESCRIPTION OF THE DRAWINGS

An embodiment of the invention will be described below with reference to the attached drawings, wherein.

DETAILED DESCRIPTION OF PREFERRED EMBODIMENTS

Figure 1:
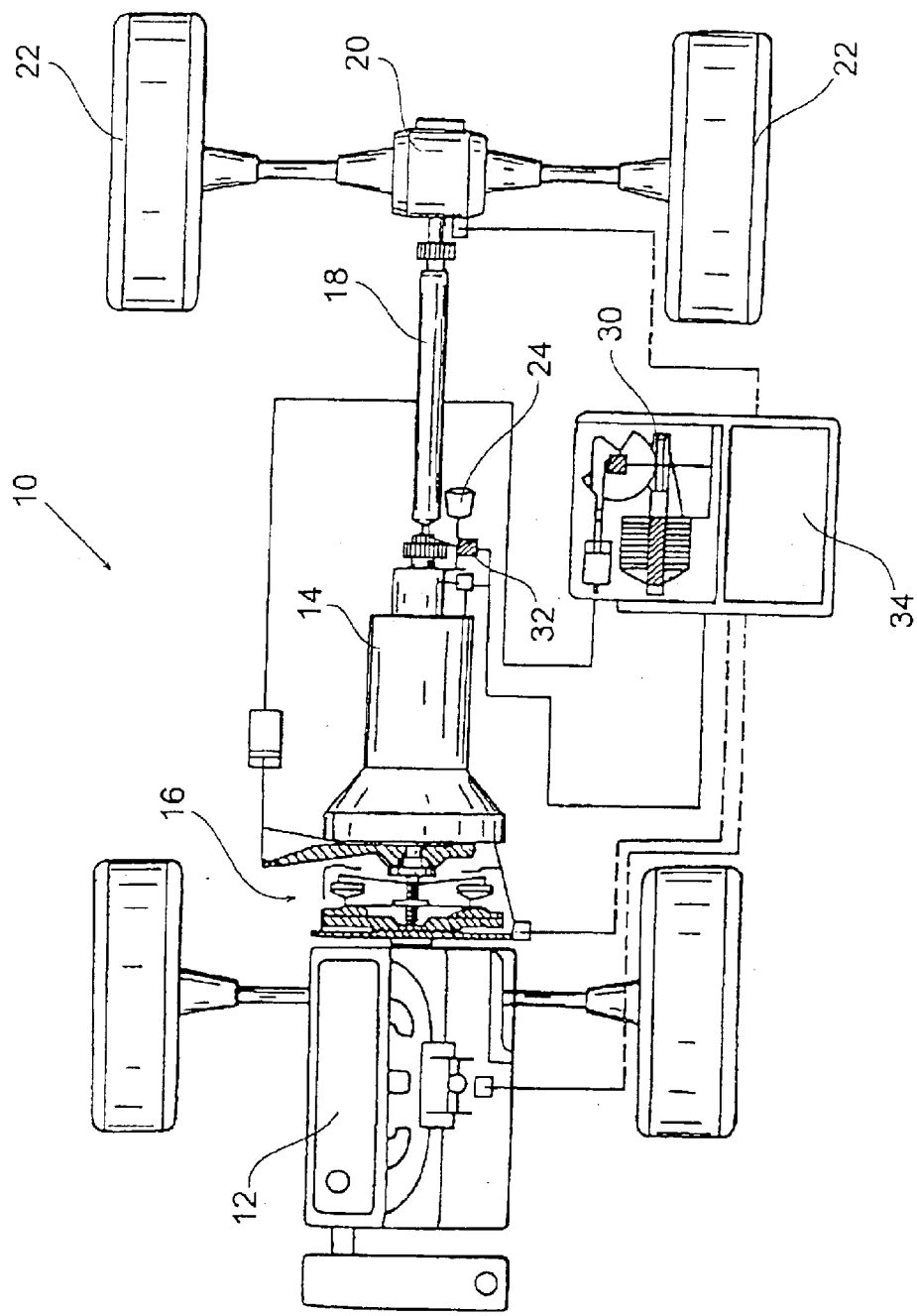
FIG. 1 schematically represents a vehicle with a clutch actuator driven by an electric motor.

The vehicle 10 illustrated in FIG. 1 has an internal combustion engine 12 that is connected to a shiftable transmission 14 by way of a clutch 16. The transmission 14 is connected by way of the drive shaft 18 and the rear axle 20 to the driven rear wheels 22 of the vehicle 10.

A gear-shifting lever 24 is connected mechanically to the transmission 14 in a conventional manner for a manual selection of the gear ratio. The engagement and disengagement of the clutch 16 is controlled by a clutch actuator 30 that is driven by an electric motor. A sensor 32 at the gear-shifting lever 24 sends a signal to a control unit 34 which directs the clutch actuator 30 to disengage and re-engage the clutch 16 as needed when a gear shift is initiated by a movement of the gear-shifting lever 24.

Figure 2:
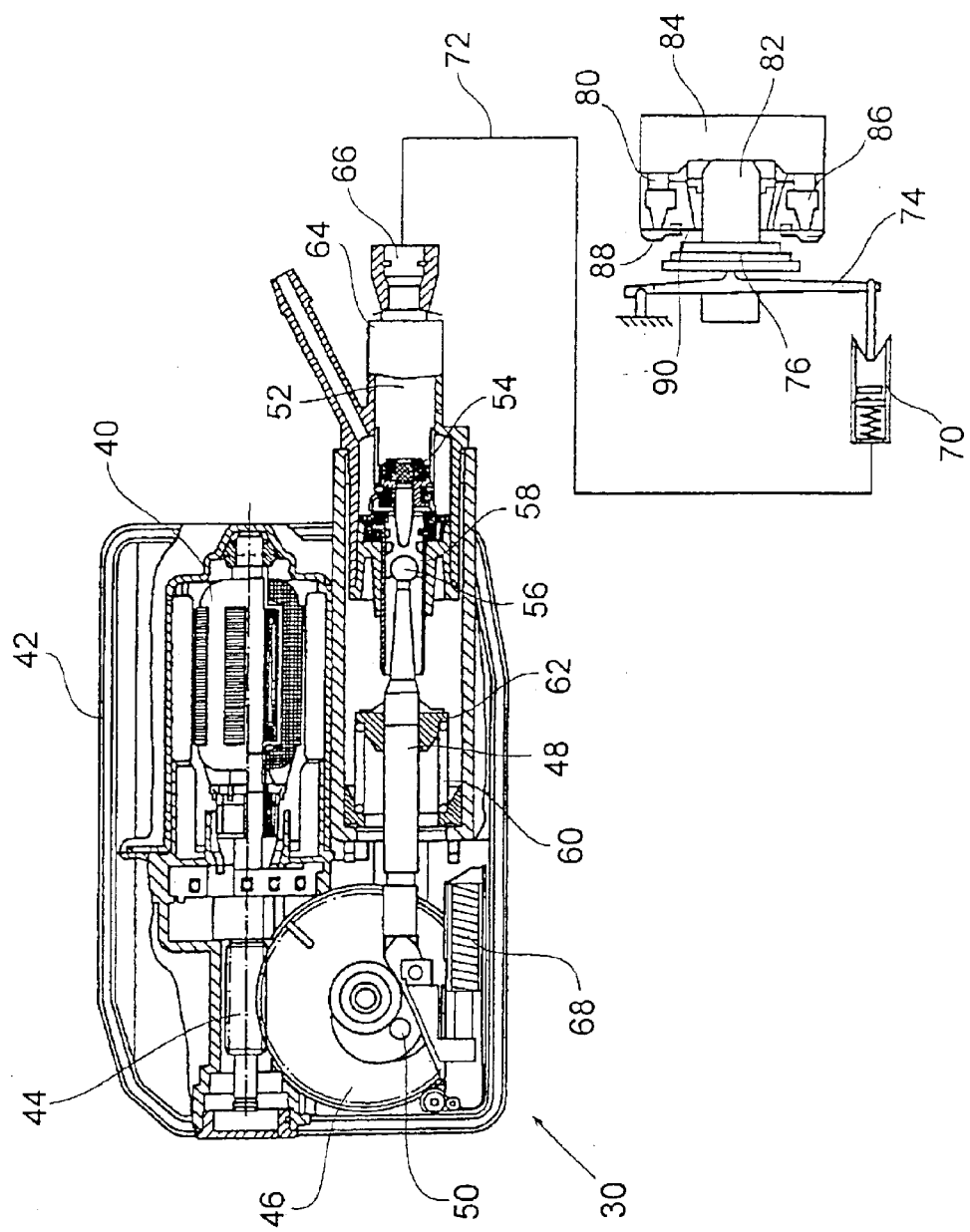
FIG. 2 gives a more detailed view of the clutch actuator driven by the electric motor and the clutch of the vehicle of FIG. 1.

As shown in FIG. 2, the clutch actuator 30 has a direct current motor 40 (for example a brushless, electronically commutated DC motor) mounted on the housing 42. The electric motor 40 is either directly connected to a push rod 48 or through a fixed-ratio gear mechanism with a worm 44 and a worm gear wheel 46 connected to a crank 50 driving the push rod 48, so that the rotary movement of the worm gear wheel 46 is converted into a linear movement of the pushrod 48. Instead of the worm gear drive 44, 46, one could also use other arrangements for transmitting the rotation of the electric motor 40 to the push rod 48. Possible alternatives include, e.g., a planetary gear mechanism, a spur gear mechanism, a cam disk mechanism, or a spindle drive mechanism.

The free end of the pushrod 48 is connected to a piston 54 of a hydraulic master cylinder 52 that is formed integrally in the housing 42 of the electric motor. The push rod 4 is connected to the piston 52 through a ball joint 56 that is snap-fitted into a spherical cavity 58 formed on the axis of the piston 54. A helical compression spring 60 acts between the housing 42 and a ring collar 62 on the push rod 48 to urge the push rod 48 towards the closed end 64 of the master cylinder 52. A hydraulic port 66 is arranged at the end 64 of the master cylinder 52.

A position sensor 68 in the form of a linear potentiometer is arranged at the push rod 48 to deliver a signal indicating the position of the push rod 48.

The port 66 of the master cylinder 52 is connected by way of a hydraulic conduit 72 to a slave cylinder 70 of the clutch 16. The slave cylinder 70 is connected to a clutch release fork which acts on the clutch release bearing 76 to move the clutch 16 into and out of engagement in a conventional manner.

The clutch 16 includes a friction disc 80 that is connected to the input shaft 82 of the transmission 14. The friction disc 80 is mounted coaxially between a flywheel 84 that is connected to the engine and a pressure plate 86 that is connected to the flywheel 84 by way of a clutch housing 88 so that the pressure plate 86 is constrained to share the rotation of the flywheel 84 but is axially movable relative to the flywheel 84. The pressure plate 86 is pushed towards the flywheel 84 by a diaphragm spring 90, so that the friction disc 80 is clamped between the pressure plate and the flywheel in order to transmit torque between the engine 12 and the transmission 14. The clutch 16 is released (taken out of engagement) when a force in the direction towards the flywheel is applied through the release fork 74 and the release bearing 76 to a radially inner portion of the diaphragm spring.

Instead of a hydraulic link between the clutch actuator 30 and the release fork 74, one could also use a pneumatic or mechanical connection where the push rod 48 could act, e.g., either directly or through a mechanical linkage or cable on the release fork.

When the clutch 16 is fully engaged, the clutch actuator 30 will be in the position shown in FIG. 2, where the push rod 48 is moved hard to the left, so that the piston 54 of the master cylinder 52 is at the limit of its movement on the far side from the end 64 of the master cylinder and the spring 60 is fully compressed.

Figure 3:
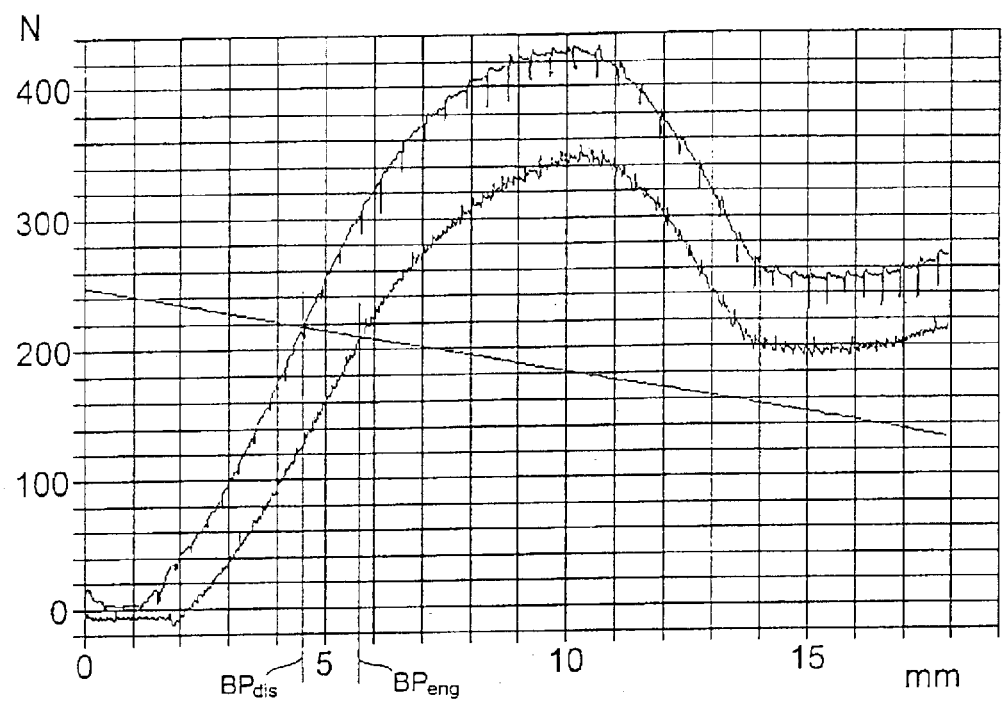
FIG. 3 shows graphic plots of force vs. actuator travel for the clutch diaphragm spring and for the actuator compensation spring illustrated in FIG. 2.

When the electric motor 40 is energized to disengage the clutch 16, the push rod 48 is moved to the right, so that the piston 54 moves towards the end 64 of the master cylinder 52. As a result, fluid is displaced from the master cylinder 52 to the slave cylinder 70, causing the piston of the slave cylinder 70 to exert a force on the release fork 74, so that the release bearing 76 will move in the direction towards the flywheel 84 and exert a force on the inner circumference of the diaphragm spring 90. This reduces the force exerted by the diaphragm spring on the pressure plate 86 and thus releases the clamping pressure on the friction disc 80. As shown in FIG. 3, the force generated by the fully compressed spring 60 is initially larger than the reactive force of the diaphragm spring 90. Consequently, the movement of the push rod 48 and the piston 54 are driven initially by the force that is generated by the spring 60, so that the load on the electric motor 40 will be very small, as the motor has to deliver only enough power to permit the movement of the push rod 48 under the action of the spring 60.

In the equilibrium position where the force generated by the spring 60 is in balance with the reactive force of the diaphragm spring, the force required to continue the disengagement of the clutch 16 will be supplied the electric motor 42. As shown FIG. 3, the force applied to the diaphragm spring to fully disengage the clutch 16 is typically of the order of 430 N. The rating of the compensating spring 60 is such that a force of the order of 250 N is generated when the clutch is fully engaged and the reactive force of the diaphragm spring is substantially zero. From the fully engaged position to the equilibrium position, the force of the compensating spring decreases to about 210 N. Consequently, the electric motor 40 needs to be capable of generating a force of sufficient magnitude to depress the diaphragm spring 90 from the equilibrium position to the fully disengaged position of the clutch, i.e., the difference from 210 N to 430 N, and to fully compress the spring 60 from the equilibrium position to the completely engaged position of the clutch. Thus, an electric motor 40 capable of generating a force of 220 N to 250 N will be adequate instead of a motor 40 capable of more than 430 N which would be required in the absence of the compensating spring. As illustrated in the graph of FIG. 3, the equilibrium position $BP_{dis}$ in a disengagement phase of the clutch 16 differs from the equilibrium position $BP_{eng}$ in an engagement phase because of the hysteresis of the diaphragm spring 90. The equilibrium positions $BP_{dis}$ and $BP_{eng}$ are at 4.5 mm and 5.7 mm, respectively, measured from the fully engaged position of the clutch.

In electric actuators of the type disclosed herein, when the electric motor is switched off, the force exerted by the compensating spring 60 in the fully engaged clutch position or the force of the diaphragm spring 90 in the fully disengaged position will cause the electric motor to turn back, so that the actuator 30 moves out of its required position, unless there is a significant amount of friction in the mechanism. If during a gear shift, the actual position of the actuator 30 differs from the required position by more than a predetermined amount, the electric motor 40 is energized again to return the actuator to the required position. In order to avoid this condition when the actuator 30 is at rest, it has been proposed to apply a current of sufficient magnitude to the electric motor 40 to hold the motor 40 in position, but not large enough to cause the actuator 30 to move. Typically, a voltage of 7% of the full PWM voltage is applied to the electric motor 40 for this purpose. Preferably, the value of 7 percent represents the percentage of "on" time (also called duty cycle) of the PWM voltage, in which case the pulse height is constant, but alternatively it is also possible to use a variable DC voltage. The method of applying a PWM voltage level of 7% to the electric motor is used only if the actuator 30 is in its rest position during a gear shift, where the actuator 30 is between the equilibrium position and the fully disengaged position of the clutch 16. To use this method, it is therefore necessary to know the exact equilibrium position of the actuator/clutch system.

As the equilibrium position of the actuator/clutch system changes as a result of wear on the friction surfaces of the clutch 16, it will be necessary to calibrate the actuator/clutch system at some points in time during the life of the vehicle.

Figure 4:
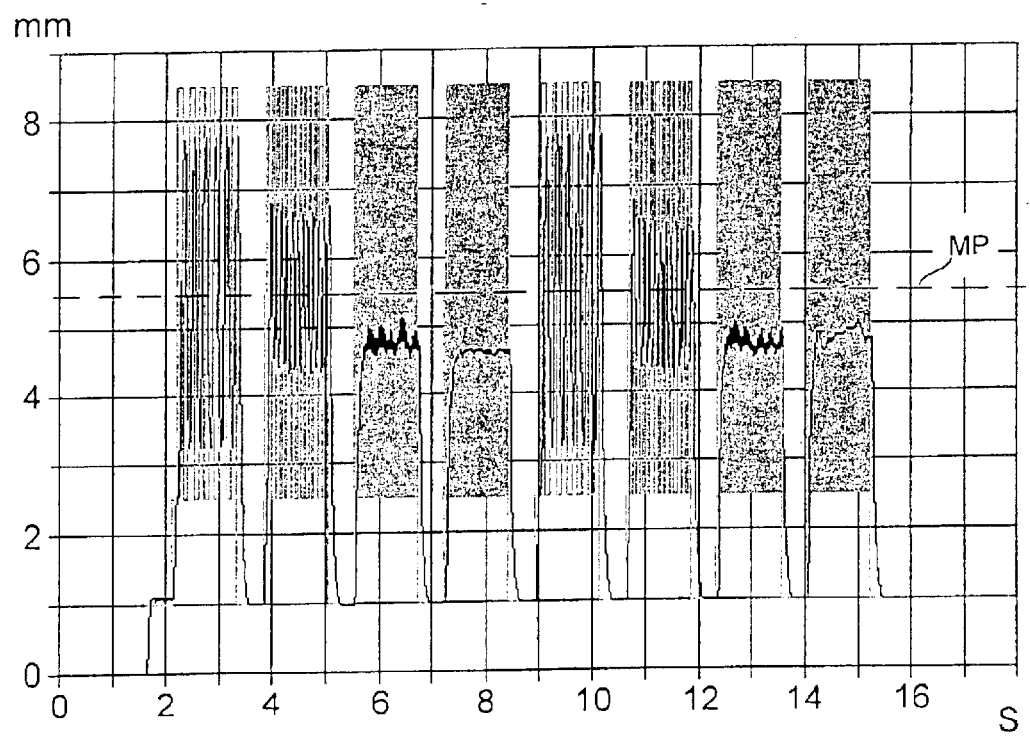
FIG. 4 shows a graph of the actual position taken by the actuator when alternating position signals of high amplitude are applied to the actuator at varying frequencies.

FIG. 4 illustrates the effect of applying an alternating position signal to the electric motor 40 of the actuator 30 at different frequencies, i.e., 5 Hz, 10 Hz, 25 Hz, and 50 Hz. The position signal has an amplitude of 6 mm and a midpoint MP of the oscillation lying in the vicinity of the predicted equilibrium point of the system composed of the actuator 30 and clutch 16. If the position signal is applied when the clutch 16 is in the fully engaged position, the electric motor 40 with the assistance of the compensating spring 60 will move the actuator 30 rapidly to the equilibrium position. At this point, the actuator 30 continues to move at a slower speed because the motor itself will now have to contribute a part of the force to overcome the reactive force of the diaphragm spring 90. Consequently, even at a frequency of 5 Hz the actuator will not completely follow the position signal to the required position before the position signal is reversed. Upon reversal of the position signal, the electric motor 40 with the assistance of the diaphragm spring 90 rapidly returns the actuator 30 to the equilibrium position and then continues to move at a slower speed because the motor will now have to contribute a part of the force to compress the compensating spring 60. The higher the frequency of the position signal, the less the actuator will overshoot the equilibrium position, and at the frequencies of 25 Hz and 50 Hz shown in FIG. 4, the actuator settles at the equilibrium position.

Figure 5:
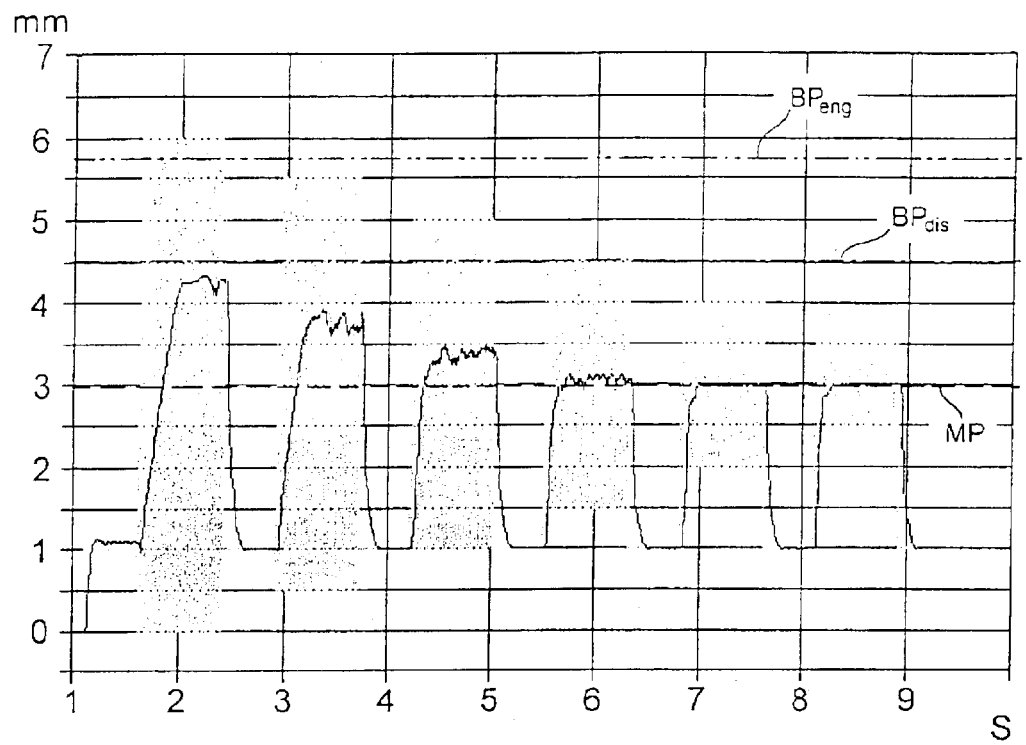
FIG. 5 shows a graph of the actual position taken by the actuator when an alternating high-frequency position signal is applied to the actuator at varying amplitudes.

FIG. 5 shows the behavior of an actuator 30 at alternating position signals with a uniform frequency of 50 Hz and different amplitudes. With a smaller amplitude of the position signals, the actuator 30 settles near the midpoint of the alternating position signal, and the larger the amplitude, the closer the actuator 30 will settle to a position corresponding to the equilibrium state of the actuator/clutch system.

Figure 6:
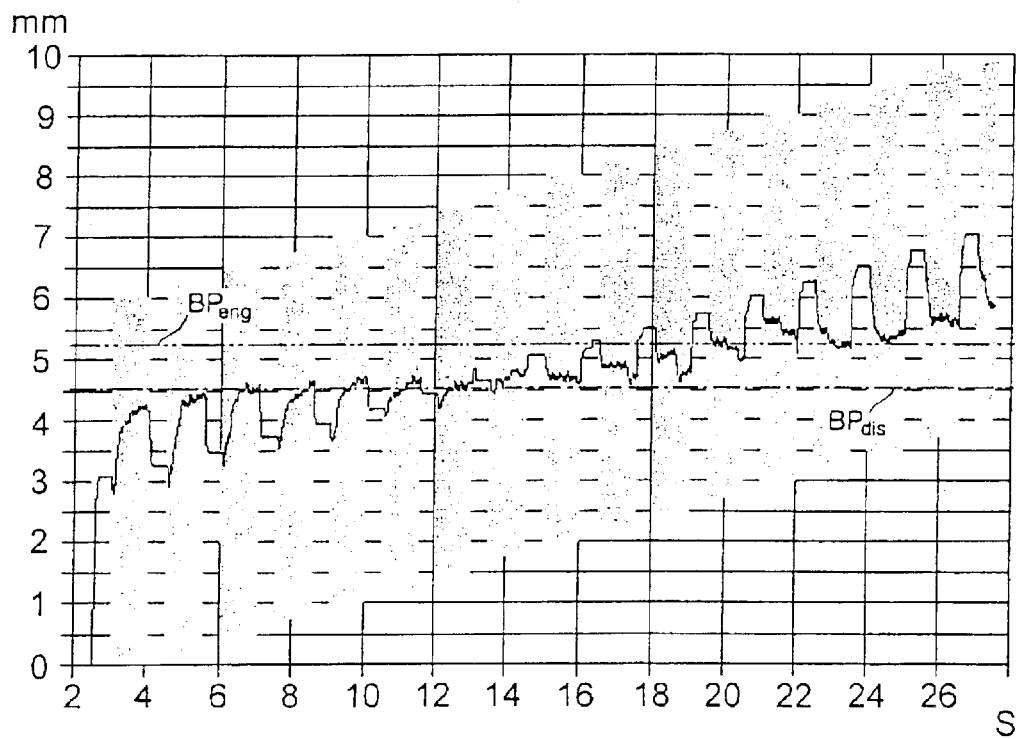
FIG. 6 shows a graph of the actual position taken by the actuator when an alternating position signal of large amplitude and high frequency is applied to the actuator with a varying midpoint of the alternating signal moving progressively nearer to the equilibrium position of the actuator.

Finally, FIG. 6 illustrates the effect of varying the midpoint of a position signal with a frequency of 50 Hz and an amplitude of 6 mm. As the graph shows, the accuracy of determining the equilibrium position is improved as the midpoint of the position signal approaches the equilibrium position.

According to an embodiment of the invention, the equilibrium position of an actuator 30 is calibrated by applying an alternating position signal to the actuator with a frequency of 50 Hz and an amplitude of 6 mm, while the actual position of the actuator 30 is determined, e.g., by a position sensor 68. Initially, the midpoint of the alternating position signal is set to coincide with a calculated or previously determined equilibrium position.

The foregoing cycle is repeated with the midpoint repositioned to coincide with the equilibrium position that has been newly determined in the foregoing cycle. Further iterations are performed until the detected equilibrium position coincides with the midpoint of the position signal.

Various modifications are possible without departing from the scope of the invention. Although an alternating position signal of 50 Hz is used in the foregoing preferred embodiment of the invention, one could use position signals alternating at some other frequency above 25 Hz. Furthermore, while an amplitude of 6 mm is used in the preceding embodiment, it is self-evident that the amplitude used in an actual use of the invention depends on the travel range of the actuator between the fully engaged and fully disengaged positions of the clutch and on the location of the equilibrium position relative to the endpoints of the travel range.

While the invention has been described with reference to a clutch actuator, it is equally applicable to other electronically controlled, motor-driven actuators that are equipped with a compensating spring and are used to actuate the movement of a mechanism that produces an elastic reactive force. Examples of other possible uses of the inventive concept include actuators used in gear selector mechanisms. Actuators according to the present invention may also be used in automatic or semi-automatic transmissions.

What is claimed is:

1. A method of calibrating an equilibrium position of an actuator driven by an electric motor and assisted by a compensating spring, wherein the actuator moves a mechanism that opposes the movement with an elastic force, wherein the compensating spring counteracts and in said equilibrium position counterbalances the elastic force, the method comprising the steps of:

applying a large-amplitude, high-frequency alternating position signal to energize the electric motor, wherein the position signal is biased so that alternating extremes of the position signal straddle the equilibrium position, measuring an actual dynamically variable position of the actuator by means of a position sensor associated with the actuator, and determining the equilibrium position as that position where the actuator settles.

2. The method of claim 1, wherein the position signal alternates with a frequency of at least 25 Hz.

3. The method of claim 2, wherein the position signal alternates with a frequency of the order of 50 Hz.

4. The method of claim 1, wherein the position signal has an amplitude of the order of 6 millimeters.

5. The method of claim 1, further comprising the steps of estimating the equilibrium position, and biasing the position signal so that a midpoint between the alternating extremes of the position signal coincides with the estimated equilibrium position.

6. The method of claim 5, wherein after a first cycle, the method is repeated in consecutive cycles, and wherein each following cycle comprises the steps of:

applying a current position signal with a current midpoint coinciding with the equilibrium position determined in the preceding cycle, determining a current equilibrium position and comparing it to the current midpoint, and ending the method if the current equilibrium position coincides with the current midpoint.

* * * * *